US012652103B2

(12) United States Patent
Wang et al.

(10) Patent No.: US 12,652,103 B2
(45) Date of Patent: Jun. 9, 2026

(54) METHOD TO PREDICT AND FIT ANTENNA PHASE CENTER OF LEO SATELLITE CONSIDERING ATTITUDE INFORMATION

(71) Applicant: National Time Service Center, Chinese Academy of Sciences, Xi'an (CN)

(72) Inventors: Kan Wang, Xi'an (CN); Hang Su, Xi'an (CN); Baoqi Sun, Xi'an (CN); Xuhai Yang, Xi'an (CN)

(73) Assignee: NATIONAL TIME SERVICE CENTER, CHINESE ACADEMY OF SCIENCES, Xi'an (CN)

( * ) Notice: Subject to any disclaimer, the term of this patent is extended or adjusted under 35 U.S.C. 154(b) by 286 days.

(21) Appl. No.: 18/638,695

(22) Filed: Apr. 18, 2024

(65) Prior Publication Data

US 2025/0150167 A1 May 8, 2025

(30) Foreign Application Priority Data

Nov. 7, 2023 (CN) .......................... 202311469768.9

(51) Int. Cl.
*H04B 7/185* (2006.01)
*H04B 17/391* (2015.01)

(52) U.S. Cl.
CPC ..... *H04B 7/18582* (2013.01); *H04B 7/18539* (2013.01); *H04B 7/18545* (2013.01); *H04B 17/3913* (2015.01)

(58) Field of Classification Search
CPC ............ H04B 7/18582; H04B 7/18539; H04B 7/18545; H04B 17/3913; Y02D 30/70
See application file for complete search history.

(56) References Cited

U.S. PATENT DOCUMENTS

2022/0163677 A1* 5/2022 Muthuraman ........ G01S 19/235

FOREIGN PATENT DOCUMENTS

EP        1752783 A2 * 2/2007 ............. G01S 19/48
EP        2300845 B1 * 10/2013 ............. G01S 19/23

* cited by examiner

*Primary Examiner* — Afshawn M Towfighi

(57) ABSTRACT

A method to predict and fit an APC of a LEO satellite considering attitude information is provided, which includes: transforming a spacecraft body-fixed coordinate system, obtaining a transformation matrix from orbital coordinate system to transformed spacecraft body-fixed coordinate system, obtaining rotation angles during a rotation process, obtaining rotation angles in orbit determination time period to predict rotation angles in orbit prediction time period, obtaining a transformation matrix from spacecraft body-fixed coordinate system to Earth-fixed coordinate system of each prediction moment, obtaining a correction vector from a CoM to a phase center of a downlink signal antenna in the Earth-fixed coordinate system at each prediction moment, and obtaining an orbit of the phase center of the downlink signal antenna of a LEO satellite, and performing an ephemeris parameter fitting on the orbit of the phase center of the downlink signal antenna of the LEO satellite in a fitting time period.

9 Claims, 3 Drawing Sheets

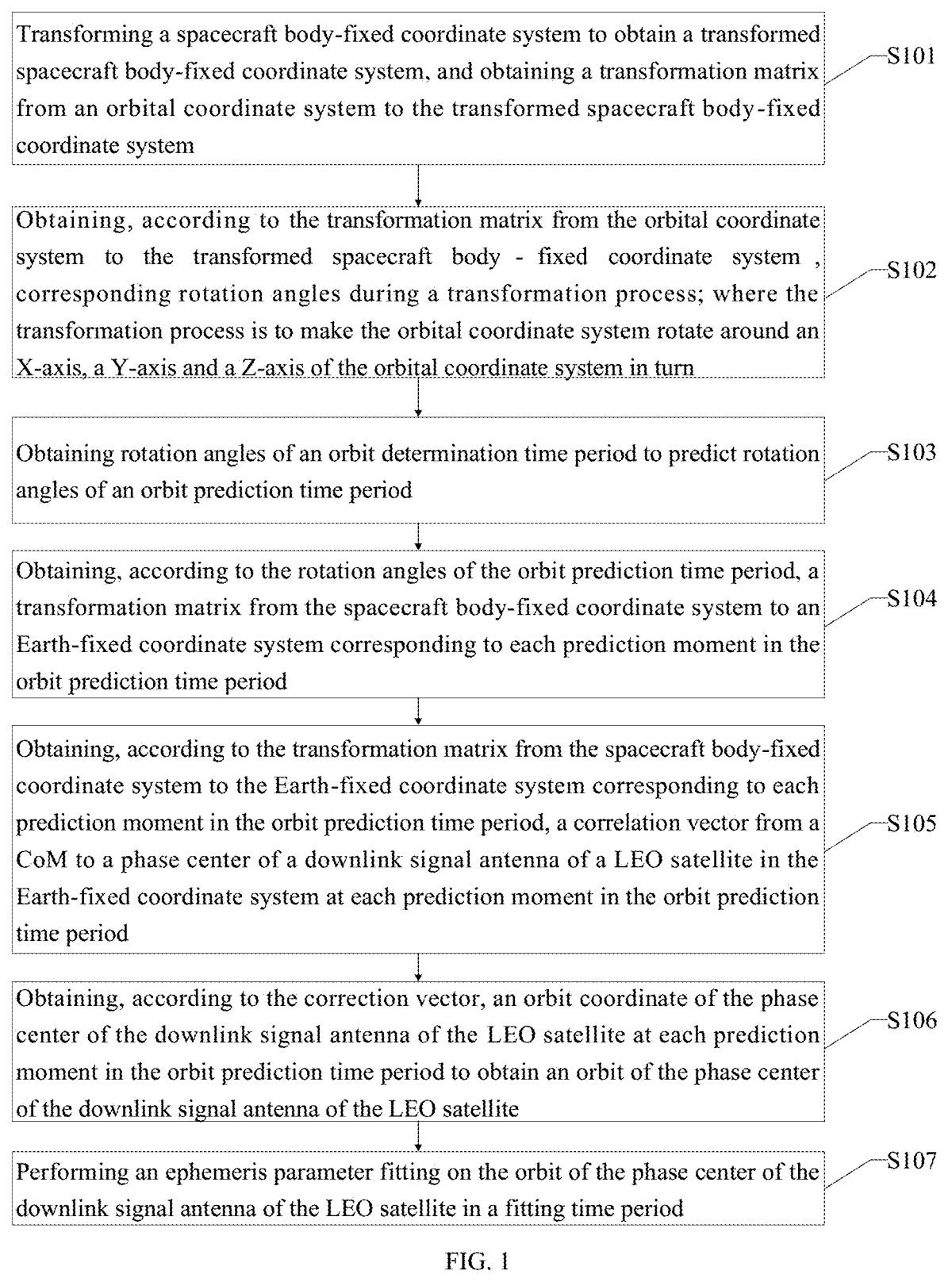

Transforming a spacecraft body-fixed coordinate system to obtain a transformed spacecraft body-fixed coordinate system, and obtaining a transformation matrix from an orbital coordinate system to the transformed spacecraft body-fixed coordinate system — S101

Obtaining, according to the transformation matrix from the orbital coordinate system to the transformed spacecraft body - fixed coordinate system , corresponding rotation angles during a transformation process; where the transformation process is to make the orbital coordinate system rotate around an X-axis, a Y-axis and a Z-axis of the orbital coordinate system in turn — S102

Obtaining rotation angles of an orbit determination time period to predict rotation angles of an orbit prediction time period — S103

Obtaining, according to the rotation angles of the orbit prediction time period, a transformation matrix from the spacecraft body-fixed coordinate system to an Earth-fixed coordinate system corresponding to each prediction moment in the orbit prediction time period — S104

Obtaining, according to the transformation matrix from the spacecraft body-fixed coordinate system to the Earth-fixed coordinate system corresponding to each prediction moment in the orbit prediction time period, a correlation vector from a CoM to a phase center of a downlink signal antenna of a LEO satellite in the Earth-fixed coordinate system at each prediction moment in the orbit prediction time period — S105

Obtaining, according to the correction vector, an orbit coordinate of the phase center of the downlink signal antenna of the LEO satellite at each prediction moment in the orbit prediction time period to obtain an orbit of the phase center of the downlink signal antenna of the LEO satellite — S106

Performing an ephemeris parameter fitting on the orbit of the phase center of the downlink signal antenna of the LEO satellite in a fitting time period — S107

FIG. 1

METHOD TO PREDICT AND FIT ANTENNA PHASE CENTER OF LEO SATELLITE CONSIDERING ATTITUDE INFORMATION

TECHNICAL FIELD

The disclosure relates to the field of communication, navigation, and remote sensing technologies, and more particularly to a method to predict and fit an antenna phase center (APC) of a low Earth orbit (LEO) satellite considering attitude information.

BACKGROUND

LEO satellites, with their low altitudes, fast speed, low cost and other features, make positioning, navigation and timing (PNT) of a LEO navigation-augmented global navigation satellite system (GNSS) have a series of advantages such as a strong signal strength, a short convergence time and a multipath effect whitening, thereby receiving more and more attention in recent years.

Existing processes of orbit determination, orbit prediction and ephemeris parameter fitting of the LEO satellites are basically aimed at the center of mass (COM) of the LEO satellites. Due to a movement and a change of the CoM of the LEO satellites with a dynamical model, CoM orbit determination can achieve high precision under a situation of accurate calibrations of the COM and a phase center offset (PCO) of a spaceborne GNSS antenna, and attitude of the LEO satellites basically has no effect on results of the orbit prediction and the ephemeris parameter fitting performed based on a precise orbit determination result of the CoM. Different ephemeris parameters can be directly fitted based on the precise orbit determination and the orbit prediction of the CoM of the LEO satellite, and each group of the ephemeris parameters can restore COM orbit coordinates under a certain fitting time period. However, since an actual orbit required by a ground user is a phase center position of a downlink signal antenna, rather than a COM position of the LEO satellite, it is inconvenient for the ground user to use the CoM orbit determination result directly, and is necessary to correct the CoM to the antenna phase center (APC). Due to the rapid variation of corrections and their high dependence on the attitude of the LEO satellites, the ground user needs to obtain attitude data of the LEO satellites in real-time to perform this additional process, thereby obtaining the required APC orbit, and for LEO satellites with unstable attitude control or LEO satellites with significant deviation from an original attitude setting, a loss of real-time attitude data can easily lead to significant APC orbit errors, so as to affect a positioning result.

Current GNSS broadcast ephemeris is fitted based on the phase center of the GNSS satellite downlink navigation signal antenna to obtain ephemeris parameters, an APC orbit restored by the GNSS broadcast ephemeris is not a precision orbit, and has orbital errors in decimeter to meter range. A general GNSS post-fit precision orbit document is a CoM orbit; real-time streaming products of the GNSS orbit are divided into the COM orbit and the APC orbit, but the real-time streaming of the GNSS orbit is a high-frequency XYZ correction broadcast based on low-frequency GNSS broadcast ephemeris, not the ephemeris parameters themselves. The GNSS broadcast ephemeris can directly restore an orbit based on the phase center of a downlink signal antenna, however, the precision of the GNSS broadcast ephemeris is low, and it is necessary to broadcast real-time streaming of the correction to restore the precision orbit.

Meanwhile, the GNSS orbit is higher than the LEO satellite orbit, and there are significant differences in the number, shape, and fitting duration of the ephemeris parameters of the GNSS orbit compared to the LEO satellites. The GNSS satellites have a high cost and stable attitude control, while low-cost LEO satellites may face problems such as increased attitude deviation and insufficient stability.

Therefore, it is urgent to improve the problems of the LEO satellites with low cost or with increased attitude deviation, and insufficient stability in the related art.

SUMMARY

In order to solve the above problems that existed in the related art, the disclosure provides a method to predict and fit an APC of a LEO satellite considering attitude information. Technical problems to be solved by the disclosure are achieved through the following technical solutions.

The disclosure provides a method to predict and fit an APC of a LEO satellite considering attitude information, and the method includes:

transforming a spacecraft body-fixed coordinate system to obtain a transformed spacecraft body-fixed coordinate system, and obtaining a transformation matrix from an orbital coordinate system to the transformed spacecraft body-fixed coordinate system;

obtaining, according to the transformation matrix from the orbital coordinate system to the transformed spacecraft body-fixed coordinate system, corresponding rotation angles during a transformation process; wherein the transformation process is to make the orbital coordinate system rotate around an X-axis, a Y-axis and a Z-axis of the orbital coordinate system in turn;

obtaining rotation angles of an orbit determination time period to predict rotation angles of an orbit prediction time period;

obtaining, according to the rotation angles of the orbit prediction time period, a transformation matrix from the spacecraft body-fixed coordinate system to an Earth-fixed coordinate system corresponding to each prediction moment in the orbit prediction time period;

obtaining, according to the transformation matrix from the spacecraft body-fixed coordinate system to the Earth-fixed coordinate system corresponding to each prediction moment in the orbit prediction time period, a correction vector from a CoM to a phase center of a downlink signal antenna of a LEO satellite in the Earth-fixed coordinate system at each prediction moment in the orbit prediction time period;

obtaining, according to the correction vector, an orbit coordinate of the phase center of the downlink signal antenna of the LEO satellite at each prediction moment in the orbit prediction time period, thereby obtaining an orbit of the phase center of the downlink signal antenna of the LEO satellite; and performing an ephemeris parameter fitting on the orbit of the phase center of the downlink signal antenna of the LEO satellite in a fitting time period.

In an exemplary embodiment, the method to predict and fit the APC of the LEO satellite considering attitude information further includes: obtaining an ephemeris parameter fitting result, and sending the ephemeris parameter fitting result to a ground user, thereby determining a real-time position of the LEO satellite.

The beneficial effects of the disclosure are as follows.

The disclosure provides a method to predict and fit the APC of the LEO satellite considering attitude information, the transformation matrix from the orbital coordinate system to the transformed spacecraft body-fixed coordinate system is calculated according to existing attitude data, and the rotation angles are further calculated, so as to predict the rotation angles and the transformation matrix corresponding to each prediction moment in the orbit prediction time period, the correction vector from the CoM to the phase center of the downlink signal antenna of the LEO satellite at each prediction moment in the orbit prediction time period is calculated, a predicted APC orbit is obtained, and the ephemeris parameters of the APC are fitted based on the predicted APC orbit. Thus, the orbit of the phase center of the downlink signal antenna of the LEO satellite is predicted according to the existing attitude data, and the ephemeris parameter fitting is performed based on the predicted APC orbit. On a basis of considering attitude factors, the orbit of the APC of the LEO satellite is accurately predicted, and the APC orbit is directly fitted with the ephemeris parameters of the LEO satellite, rather than fitting the CoM orbit. On the one hand, it is convenient for a ground user to restore a phase center coordinate of the downlink signal antenna of the LEO satellite by using the ephemeris parameters, and saves processes of collecting the attitude data and calculating a correction from the CoM to the APC for the ground user. On the other hand, a broadcasting process of a correction from a high-frequency COM to the APC is saved, so that the ground user can avoid receiving a high-frequency correction and relying on the internet, and the orbit of the phase center of the downlink signal antenna of the LEO satellite can be directly restored by the ephemeris parameters broadcast by the LEO satellite.

The disclosure will be further described in detail in conjunction with drawings and embodiments below.

BRIEF DESCRIPTION OF DRAWINGS

FIG. 1 illustrates a flowchart of a method to predict and fit an APC of a LEO satellite considering attitude information according to an embodiment of the disclosure.

DETAILED DESCRIPTION OF EMBODIMENTS

Figure 2:
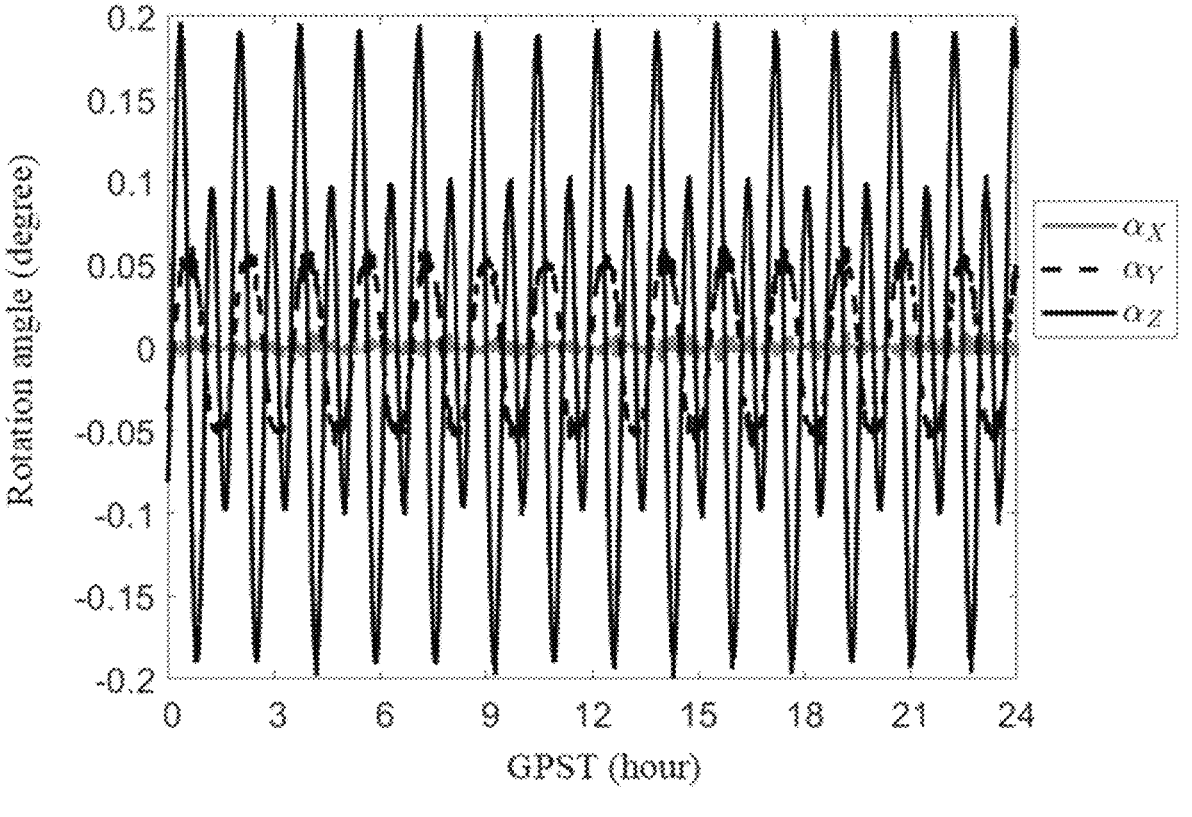
FIG. 2 illustrates a schematic diagram of a time series of three rotation angles of a LEO satellite on a day in 2018.

The disclosure is further described in detail in conjunction with embodiments below, but the embodiments of the disclosure are not limited to this.

Please refer to FIG. 1, FIG. 1 illustrates a flowchart of a method to predict and fit an APC of a LEO satellite considering attitude information according to an embodiment of the disclosure. The method to predict and fit the APC of the LEO satellite considering attitude information provided by the disclosure includes the following steps S101 to S107.

In step S101, a spacecraft body-fixed coordinate system is transformed to obtain a transformed spacecraft body-fixed coordinate system, and a transformation matrix from an orbital coordinate system to the transformed spacecraft body-fixed coordinate system is obtained.

Specifically, in the embodiment, based on a definition of the spacecraft body-fixed coordinate system, in order to make directions of the three axes of the spacecraft body-fixed coordinate system the same as that of the three axes of the orbital coordinate system, it is necessary to transform the spacecraft body-fixed coordinate system to obtain the transformed spacecraft body-fixed coordinate system, and a specific process for transforming is as follows.

The spacecraft body-fixed coordinate system is transformed by using a first transformation matrix to obtain the transformed spacecraft body-fixed coordinate system. Specifically, a formula (1) of the first transformation matrix $R_{B2Bf}$ is expressed as follows:

$$R_{B2Bf} = \begin{pmatrix} 0 & 0 & -1 \\ \delta & 0 & 0 \\ 0 & -\delta & 0 \end{pmatrix}; \tag{1}$$

where $\delta$ represents a flight direction of the LEO satellite, $\delta$ can be 1 or $-1$ depending on specific definitions of the spacecraft body-fixed coordinate system by different LEO satellites. In response to the LEO satellite flying in a forward direction, $\delta$ is 1, and the flying in the forward direction refers to that an X-axis of the spacecraft body-fixed coordinate system is a direction along the orbit. In response to the LEO satellite flying in an opposite direction, $\delta$ is $-1$, and the flying in the opposite direction refers to that the X-axis of the spacecraft body-fixed coordinate system is a direction opposite to the orbit.

A specific process for obtaining the transformation matrix from the orbital coordinate system to the transformed spacecraft body-fixed coordinate system is as follows.

A second transformation matrix $R_{B2I}$ from the spacecraft body-fixed coordinate system to an inertial coordinate system (J2000.0) is obtained according to attitude quaternions $(q_0, q_1, q_2, q_3)$ of the LEO satellite at a transformation moment, and a formula (2) of the second transformation matrix $R_{B2I}$ is expressed as follows:

$$R_{B2I} = \begin{pmatrix} 1 - 2 \times (q_2^2 + q_3^2) & 2 \times (q_1 q_2 - q_0 q_3) & 2 \times (q_1 q_3 + q_0 q_2) \\ 2 \times (q_1 q_2 + q_0 q_3) & 1 - 2 \times (q_1^2 + q_3^2) & 2 \times (q_2 q_3 - q_0 q_1) \\ 2 \times (q_1 q_3 - q_0 q_2) & 2 \times (q_2 q_3 + q_0 q_1) & 1 - 2 \times (q_1^2 + q_2^2) \end{pmatrix}; \tag{2}$$

where $q_0, q_1, q_2$ and $q_3$ are the attitude quaternions of the LEO satellite.

A third transformation matrix $R_{I2RTA}$ from the inertial coordinate system to the orbital coordinate system is obtained according to a precision orbit vector $\vec{r}_L$ and a velocity vector $\vec{v}_L$ of the inertial coordinate system at the transformation moment, and a formula (3) of the third transformation matrix $R_{I2RTA}$ is expressed as follows:

$$R_{I2RTA} = \begin{pmatrix} \dfrac{\vec{v}_L}{\|\vec{v}_L\|} \times \left( \dfrac{\vec{r}_L}{\|\vec{r}_L\|} \times \dfrac{\vec{v}_L}{\|\vec{v}_L\|} \right) \\ \dfrac{\vec{v}_L}{\|\vec{v}_L\|} \\ \dfrac{\vec{r}_L}{\|\vec{r}_L\|} \times \dfrac{\vec{v}_L}{\|\vec{v}_L\|} \end{pmatrix}; \tag{3}$$

where $\|\cdot\|$ represents a modulus of each vector. It should be noted that the orbital coordinate system of the LEO satellite in formula (3) is based on a direction of velocity. It can also be formulated based on a direction of position according to formula (4):

$$R_{I2RTA} = \begin{pmatrix} \dfrac{\vec{r}_L}{\|\vec{r}_L\|} \\ \left( \dfrac{\vec{r}_L}{\|\vec{r}_L\|} \times \dfrac{\vec{v}_L}{\|\vec{v}_L\|} \right) \times \dfrac{\vec{r}_L}{\|\vec{r}_L\|} \\ \dfrac{\vec{r}_L}{\|\vec{r}_L\|} \times \dfrac{\vec{v}_L}{\|\vec{v}_L\|} \end{pmatrix}; \tag{4}$$

A fourth transformation matrix $R_{B2RTA}$ from the spacecraft body-fixed coordinate system to the orbital coordinate system is obtained according to the second transformation matrix $R_{B2I}$ and the third transformation matrix $R_{I2RTA}$, and a formula (5) of the fourth transformation matrix $R_{B2RTA}$ is expressed as follows:

$$R_{B2RTA} = R_{I2RTA} \cdot R_{B2I}. \tag{5}$$

The transformation matrix $R_{RTA2Bf}$ from the orbital coordinate system to the transformed spacecraft body-fixed coordinate system is obtained according to the fourth transformation matrix $R_{B2RTA}$ and the first transformation matrix $R_{B2Bf}$, and a formula (6) of the transformation matrix $R_{RTA2Bf}$ is expressed as follows:

$$R_{RTA2Bf} = R_{B2Bf} \cdot R_{B2RTA}^{T}; \tag{6}$$

where $$R_{B2RTA}^{T} \tag{35}$$

represents a transpose matrix of the fourth transformation matrix $R_{B2RTA}$.

In step S102, rotation angles during a rotation process are obtained according to the transformation matrix from the orbital coordinate system to the transformed spacecraft body-fixed coordinate system. The rotation process is to make the orbital coordinate system rotate around an X-axis, a Y-axis and a Z-axis of the orbital coordinate system in turn.

Specifically, in the embodiment, the process from the orbital coordinate system to the transformed spacecraft body-fixed coordinate system can be described as a process that the orbital coordinate system first rotates around the X-axis of the orbital coordinate system at an angle of $\alpha_X$, then rotates around the Y-axis of the orbital coordinate system at an angle of $\alpha_Y$, and then rotates around the Z-axis of the orbital coordinate system at an angle of $\alpha_Z$, and a formula (7) of the process from the orbital coordinate system to the transformed spacecraft body-fixed coordinate system is expressed as follows:

$$R_{RTA2Bf} = R_X(\alpha_X) \cdot R_Y(\alpha_Y) \cdot R_Z(\alpha_Z); \tag{7}$$

where $R_X(\bullet)$ represents a rotation matrix of the orbital coordinate system rotating around the X-axis of the orbital coordinate system, $R_y(\bullet)$ represents a rotation matrix of the orbital coordinate system rotating around the Y-axis of the orbital coordinate system, $R_Z(\bullet)$ represents a rotation matrix of the orbital coordinate system rotating around the Z-axis of the orbital coordinate system, and $\alpha_X$, $\alpha_Y$, and $\alpha_Z$ represent the rotation angles obtained by rotating in a counterclockwise direction.

The formula (6) is specifically expressed to obtain a formula (8), and the formula (8) is expressed as follows:

$$R_{RTA2Bf} = \begin{pmatrix} 1 & 0 & 0 \\ 0 & a & b \\ 0 & -b & a \end{pmatrix} \cdot \begin{pmatrix} c & 0 & d \\ 0 & 1 & 0 \\ -d & 0 & c \end{pmatrix} \cdot \begin{pmatrix} e & f & 0 \\ -f & e & 0 \\ 0 & 0 & 1 \end{pmatrix} = \begin{pmatrix} ce & cf & d \\ -bde - af & -bdf + ae & bc \\ -dae + bf & -daf - be & ac \end{pmatrix}; \tag{8}$$

where a=cos($\alpha_X$), b=sin($\alpha_X$), c=cos($\alpha_Y$), d=sin($\alpha_Y$), e=cos ($\alpha_Z$), and f=sin($\alpha_Z$).

It should be noted that this is a rotation of the orbital coordinate system itself, not a rotation of vectors in the same coordinate system.

The rotation angles are calculated according to the formula (8), and the rotation angles include: a rotation angle $\alpha_X$ rotating around the X-axis of the orbital coordinate system, a rotation angle $\alpha_Y$ rotating around the Y-axis of the orbital coordinate system and a rotation angle $\alpha_Z$ rotating around the Z-axis of the orbital coordinate system; and formulas (9) to (11) of the rotation angle $\alpha_X$, the rotation angle $\alpha_Y$ and the rotation angle $\alpha_Z$ are expressed as follows:

$$\alpha_X = \arctan\left( \frac{R_{RTA2Bf}(2, 3)}{R_{RTA2Bf}(3, 3)} \right); \tag{9}$$

$$\alpha_Y = \arctan\left( \frac{R_{RTA2Bf}(1, 3)}{\sqrt{R_{RTA2Bf}^2(1, 1) + R_{RTA2Bf}^2(1, 2)}} \right); \tag{10}$$

$$\alpha_Z = \arctan\left( \frac{R_{RTA2Bf}(1, 2)}{R_{RTA2Bf}(1, 1)} \right); \tag{11}$$

where arctan($\bullet$) represents an inverse tangent function, $R_{RTA2Bf}(2, 3)$ represents an element in a second row and a third column of the transformation matrix from the orbital coordinate system to the transformed spacecraft body-fixed coordinate system, $R_{RTA2Bf}(3, 3)$ represents an element in a third row and the third column of the transformation matrix from the orbital coordinate system to the transformed spacecraft body-fixed coordinate system, $R_{RTA2Bf}(1, 3)$ represents an element in a first row and the third column of the transformation matrix from the orbital coordinate system to the transformed spacecraft body-fixed coordinate system, $R_{RTA2Bf}(1, 1)$ represents an element in the first row and a first column of the transformation matrix from the orbital coordinate system to the transformed spacecraft body-fixed coordinate system, and $R_{RTA2Bf}(1, 2)$ represents an element in the first row and a second column of the transformation matrix from the orbital coordinate system to the transformed spacecraft body-fixed coordinate system.

In step S103, rotation angles of an orbit determination time period are obtained to predict rotation angles of an orbit prediction time period.

Specifically, in the embodiment, a time series of the rotation angles $\alpha_X$, $\alpha_Y$ and $\alpha_Z$ corresponding to the orbit determination time period is obtained according to the formulas (9) to (11), and the rotation angles of the orbit prediction time period are predicted according to a specific change in the time series. A specific process for predicting is as follows.

Rotation angles obtained at a last moment in the orbit determination time period are taken as the rotation angles in the orbit prediction time period; or average values of rotation angles at last moments in the orbit determination time period are taken as the rotation angles in the orbit prediction time period.

It should be noted that the disclosure only considers a situation in which the attitude control of the LEO satellite is stable and a variation range of the attitude of the LEO satellite is small.

In step S104, a transformation matrix from the spacecraft body-fixed coordinate system to an Earth-fixed coordinate system corresponding to each prediction moment in the orbit prediction time period is obtained according to the rotation angles of the orbit prediction time period.

Specifically, in the embodiment, a specific process for obtaining the transformation matrix from the spacecraft body-fixed coordinate system to the Earth-fixed coordinate system corresponding to each prediction moment in the orbit prediction time period is as follows.

A transformation matrix $R_{RTA2Bf}(t_P)$ from the orbital coordinate system to the transformed spacecraft body-fixed coordinate system at a prediction moment $t_P$ in the orbit prediction time period is obtained according to the rotation angles $\alpha_X(t_P)$, $\alpha_Y(t_P)$ and $\alpha_Z(t_P)$ of the orbit prediction time period corresponding to the prediction moment $t_P$ in the orbital prediction time period.

A transformation matrix $R_{I2RTA}(t_P)$ from the inertial coordinate system to the orbital coordinate system of the LEO satellite is obtained according to the precision orbit vector and the velocity vector of the inertial coordinate system of the LEO satellite corresponding to the prediction moment $t_P$ in the orbit prediction time period.

A transformation matrix $R_{I2E}$ from the inertial coordinate system to the Earth-fixed coordinate system at the prediction moment $t_P$ in the orbit prediction time period is obtained according to a modified Julian day of a floating point, various Earth rotation parameters and leap second information corresponding to the transformation moment.

The transformation matrix $R_{B2E}(t_P)$ from the spacecraft body-fixed coordinate system to the Earth-fixed coordinate system corresponding to each prediction moment in the orbit prediction time period is obtained according to the first transformation matrix $R_{B2Bf}$, the transformation matrix $R_{RTA2Bf}(t_P)$, the transformation matrix $R_{I2RTA}(t_P)$ and the transformation matrix $R_{I2E}$, and a formula (12) of the transformation matrix $R_{B2E}(t_P)$ is expressed as follows:

$$R_{B2E}(t_P) = R_{I2E} \cdot R_{I2RTA}^T(t_P) \cdot R_{RTA2Bf}^T(t_P) \cdot R_{B2Bf}; \qquad (12)$$

where $$R_{I2RTA}^T(t_P)$$

represents a transpose matrix of the transformation matrix $R_{I2RTA}(t_P)$, and $$R_{RTA2Bf}^T(t_P)$$

represents a transpose matrix of the transformation matrix $R_{RTA2Bf}(t_P)$. It should be noted that the first transformation matrix $R_{B2Bf}$ does not change with time.

In step S105, a correction vector from a CoM to a phase center of a downlink signal antenna of the LEO satellite in the Earth-fixed coordinate system at each prediction moment in the orbit prediction time period is obtained according to the transformation matrix from the spacecraft body-fixed coordinate system to the Earth-fixed coordinate system corresponding to each prediction moment in the orbit prediction time period.

Specifically, in the embodiment, a process for obtaining the correction vector is as follows.

A correction vector $\Delta \vec{r}_{LB}(t_P)$ from the CoM to the phase center of the downlink signal antenna of the LEO satellite in the spacecraft body-fixed coordinate system at the prediction moment $t_P$ in the orbit prediction time period is obtained;

A correction vector $\Delta \vec{r}_{LE}(t_P)$ from the CoM to the phase center of the downlink signal antenna of the LEO satellite in the Earth-fixed coordinate system at the prediction moment $t_P$ in the orbit prediction time period is obtained according to the correction vector $\Delta \vec{r}_{LB}(t_P)$ and the transformation matrix $R_{B2E}(t_P)$, and a formula (13) of the correction vector $\Delta \vec{r}_{LE}(t_P)$ is expressed as follows:

$$\Delta \vec{r}_{LE}(t_P) = R_{B2E}(t_P) \cdot \Delta \vec{r}_{LB}(t_P). \qquad (13)$$

The correction vector from the CoM to the phase center of the downlink signal antenna of the LEO satellite in the Earth-fixed coordinate system at each prediction moment in the orbit prediction time period is obtained according to the formula (13).

In step S106, an orbit coordinate of the phase center of the downlink signal antenna of the LEO satellite at each prediction moment in the orbit prediction time period is obtained according to the correction vector to obtain an orbit of the phase center of the downlink signal antenna of the LEO satellite.

Specifically, in the embodiment, a process for obtaining the orbit of the phase center of the downlink signal antenna of the LEO satellite is as follows.

A precision orbit vector $\vec{r}_{LE}(t_P)$ of the Earth-fixed coordination system of the LEO satellite at the prediction moment $t_P$ in the orbit prediction time period is obtained.

An orbit coordinate $\vec{r}_{APC}(t_P)$ of the phase center of the downlink signal antenna of the LEO satellite at the prediction time $t_P$ in the orbit prediction time period is obtained according to the precision orbit vector $\vec{r}_{LE}(t_P)$ and the correction vector $\Delta \vec{r}_{LE}(t_P)$, and a formula (14) of the orbit coordinate $\vec{r}_{APC}(t_P)$ is expressed as follows:

$$\vec{r}_{APC}(t_P) = \vec{r}_{LE}(t_P) + \Delta \vec{r}_{LE}(t_P). \qquad (14)$$

The orbit coordinate of the phase center of the downlink signal antenna of the LEO satellite at each prediction moment in the orbit prediction time period is obtained according to the formula (14) to obtain the orbit of the phase center of the downlink signal antenna of the LEO satellite.

In step S107, an ephemeris parameter fitting is performed on the orbit of the phase center of the downlink signal antenna of the LEO satellite in a fitting time period.

Specifically, in the embodiment, during the orbit prediction time period, a suitable fitting time period is selected according to a fitting duration and a corresponding relationship between the orbit prediction time period and the real-time moment. Ephemeris parameters of the LEO satellite are selected and fitted according to an orbit vector and a velocity vector of the orbit of the phase center of the downlink signal antenna of the LEO satellite in the fitting time period. Specifically, the velocity vector of the orbit of the phase center of the downlink signal antenna of the LEO satellite is equal to a velocity vector of the CoM of the LEO satellite.

It should be noted that the ephemeris parameter fitting of the LEO satellite is an existing mature method, and it is not repeated in the embodiment.

In summary, the disclosure provides a method to predict and fit the APC of the LEO satellite considering attitude information, the transformation matrix from the orbital coordinate system to the transformed spacecraft body-fixed coordinate system is calculated according to existing attitude data, and the rotation angles are further calculated, so as to predict the rotation angles and the transformation matrix corresponding to each prediction moment in the orbit prediction time period, the correction vector from the CoM to the phase center of the downlink signal antenna of the LEO satellite at each prediction moment in the orbit prediction time period is calculated, a predicted APC orbit is obtained, and the ephemeris parameters of the APC are fitted based on the predicted APC orbit. Thus, the orbit of the phase center of the downlink signal antenna of the LEO satellite is predicted according to the existing attitude data, and the ephemeris parameter fitting is performed based on the predicted APC orbit. On a basis of considering attitude factors, the orbit of the APC of the LEO satellite is accurately predicted, and the APC orbit is directly fitted with the ephemeris parameters of the LEO satellite, rather than fitting the COM orbit. On the one hand, it is convenient for a ground user to restore a phase center coordinate of the downlink signal antenna of the LEO satellite by using the ephemeris parameters, and saves processes of collecting the attitude data and calculating a correction from the COM to the APC for the ground user. On the other hand, a broadcasting process of a correction from a high-frequency COM to the APC is saved, so that the ground user can avoid receiving a high-frequency correction and relying on the internet, and the orbit of the phase center of the downlink signal antenna of the LEO satellite can be directly restored by the ephemeris parameters broadcast by the LEO satellite.

In an alternative embodiment of the disclosure, please refer to FIG. 2, FIG. 2 illustrates a schematic diagram of a time series of three rotation angles of a LEO satellite on a day in 2018.

In the embodiment, a precision orbit vector and a velocity vector of a LEO satellite with an altitude of about 800 kilometers (km) on a day in 2018 are used to calculate a time series of three rotation angles from an orbit coordinate system to a transformed spacecraft body-fixed coordinate system of the LEO satellite. As shown in FIG. 2, the attitude control of the LEO satellite is stable, and a change amplitude is within plus or minus 0.2 degrees, a standard deviation of a rate of change is generally between 0.002 and 0.008 degrees per second, which has obvious periodic phenomena, and the period is approximately the orbital period of the LEO satellite.

Figure 3:
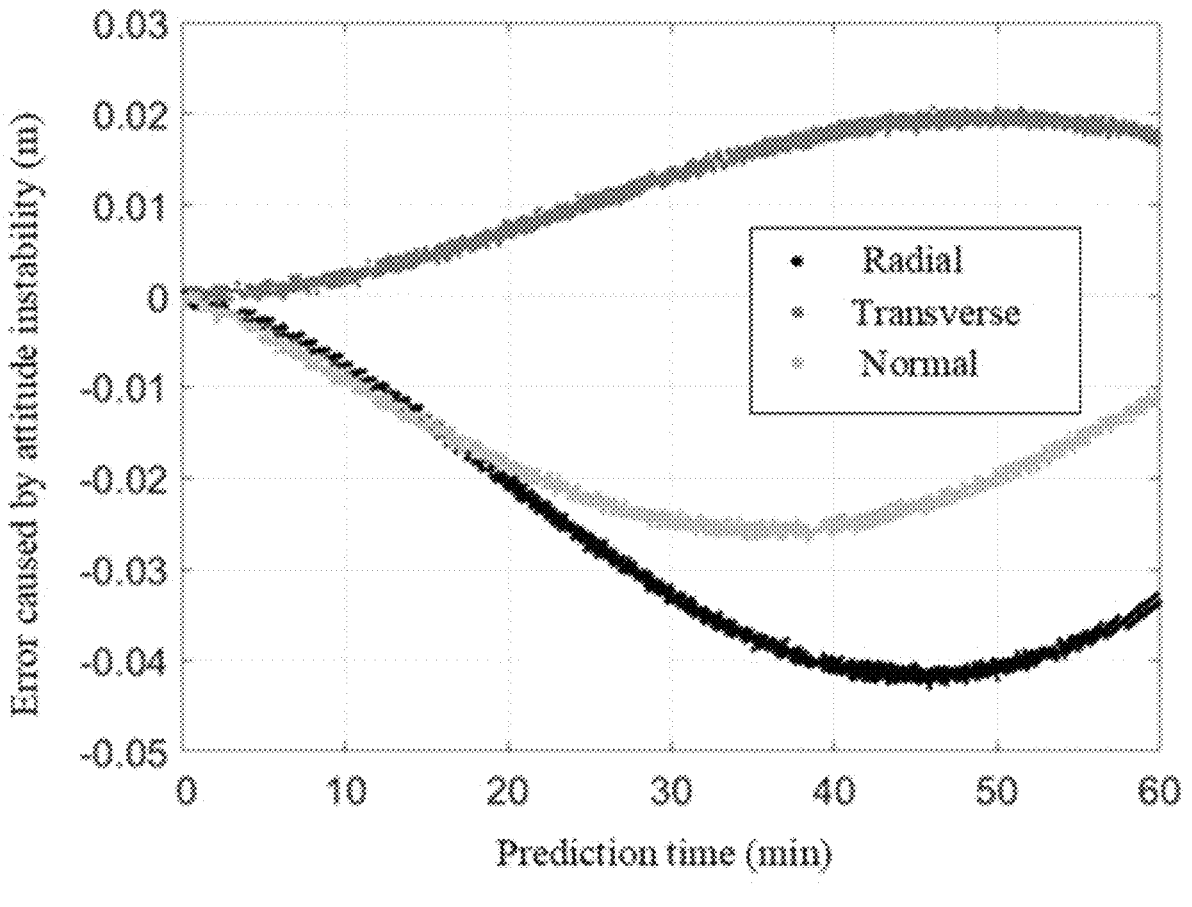
FIG. 3 illustrates a schematic diagram of an APC orbit prediction error caused by attitude instability based on simulation according to an embodiment of the disclosure.

In an alternative embodiment of the disclosure, please refer to FIG. 3, FIG. 3 illustrates a schematic diagram of an APC orbit prediction error caused by attitude instability based on simulation according to an embodiment of the disclosure. Beneficial effects of the method to predict and fit the APC of the LEO satellite considering attitude information provided by the above embodiments are described through the APC orbit prediction error caused by simulated attitude instability.

The embodiment simulates an attitude change of a trigonometric function type, the time series of the three rotation angles is constituted by a sine (sin) function, a period is approximately 1.7 hours, and standard deviations in all directions are enlarged to 0.5 degrees. An altitude and a calibration from a CoM to a phase center of a GNSS antenna of the LEO satellite are taken as examples, a rotation matrix from the spacecraft body-fixed coordinate system to the Earth-fixed coordinate system in the orbit prediction time period is restored based on three rotation angles at a last moment before predicting, and a predicted APC orbit within one day and one hour in 2018 is calculated. FIG. 3 shows the APC orbit prediction error caused by this degree of attitude instability, that is, the APC orbit prediction calculated based on the three rotation angles at the last moment, and a correction from the CoM to the APC calculated by using the existing attitude data, so as to correct an obtained difference between the predicted COM orbit and the predicted APC orbit.

It should be noted that in this paper, relationship terms such as first and second are merely used to distinguish one entity or operation from another entity or operation, without necessarily requiring or implying any actual relationship or order between these entities or operations. Moreover, terms "include", "comprise" or any other variants are intended to cover non-exclusive inclusion, thus, items or equipment that include a series of elements not only include those elements, but also other elements that are not explicitly listed. Without further limitations, the elements limited by a statement "including a . . . " do not exclude the existence of other identical elements in the item or equipment containing the elements. Terms such as "connection" or "connected" are not limited to a physical connection or a mechanical connection, but may include an electrical connection, whether direct or indirect. Orientation or position relationships indicated by "up", "down", "left", "right" and other terms are based on the orientation or position relationships shown in the drawings, and are only for convenience of describing the disclosure and simplifying the description, rather than indicating or implying that a device or an element referred to must have a specific orientation, be constructed and operated in a specific orientation, and therefore cannot be understood as a limitation of the disclosure.

In the descriptions of the specification, a description of reference terms "an embodiment", "some embodiments", "example", "specific example" or "some examples" refers to specific characteristic or features described in conjunction with the embodiment or example being included in at least one embodiment or example of the disclosure. In the specification, schematic representations of the above terms are not necessarily directed to a same embodiment or example. Moreover, particular features or characteristics described may be combined in any suitable manner in any one or more embodiments or examples. Furthermore, those skilled in the art can combine and join the different embodiments or examples described in the specification.

The above content is a further detailed description of the disclosure based on the embodiments, and it cannot be assumed that a specific implementation of the disclosure is limited to these descriptions. For those skilled in the art, multiple simple deductions or replacements can be made without departing from a concept of the disclosure, which should be considered as falling within a scope of protection of the disclosure.

What is claimed is:

1. A method to predict and fit an antenna phase center (APC) of a low Earth orbit (LEO) satellite considering attitude information, comprising:

transforming a spacecraft body-fixed coordinate system to obtain a transformed spacecraft body-fixed coordinate system, and obtaining a transformation matrix from an orbital coordinate system to the transformed spacecraft body-fixed coordinate system;

obtaining, according to the transformation matrix from the orbital coordinate system to the transformed spacecraft body-fixed coordinate system, corresponding rotation angles during a transformation process; wherein the transformation process is to make the orbital coordinate system rotate around an X-axis, a Y-axis and a Z-axis of the orbital coordinate system in turn;

obtaining rotation angles of an orbit determination time period to predict rotation angles of an orbit prediction time period;

obtaining, according to the rotation angles of the orbit prediction time period, a transformation matrix from the spacecraft body-fixed coordinate system to an Earth-fixed coordinate system corresponding to each prediction moment in the orbit prediction time period;

obtaining, according to the transformation matrix from the spacecraft body-fixed coordinate system to the Earth-fixed coordinate system corresponding to each prediction moment in the orbit prediction time period, a correction vector from a center of mass (COM) to a phase center of a downlink signal antenna of a LEO satellite in the Earth-fixed coordinate system at each prediction moment in the orbit prediction time period;

obtaining, according to the correction vector, an orbit coordinate of the phase center of the downlink signal antenna of the LEO satellite at each prediction moment in the orbit prediction time period to obtain an orbit of the phase center of the downlink signal antenna of the LEO satellite; and performing an ephemeris parameter fitting on the orbit of the phase center of the downlink signal antenna of the LEO satellite in a fitting time period.

2. The method to predict and fit the APC of the LEO satellite considering attitude information as claimed in claim 1, wherein the transforming a spacecraft body-fixed coordinate system to obtain a transformed spacecraft body-fixed coordinate system, comprises:

transforming, by using a first transformation matrix $R_{B2Bf}$, the spacecraft body-fixed coordinate system to obtain the transformed spacecraft body-fixed coordinate system; wherein a formula of the first transformation matrix $R_{B2Bf}$ is expressed as follows:

$$R_{B2Bf} = \begin{pmatrix} 0 & 0 & -1 \\ \delta & 0 & 0 \\ 0 & -\delta & 0 \end{pmatrix};$$

wherein $\delta$ represents a flight direction of the LEO satellite; in response to the LEO satellite flying in a forward direction, $\delta$ is 1; and in response to the LEO satellite flying in an opposite direction, $\delta$ is −1.

3. The method to predict and fit the APC of the LEO satellite considering attitude information as claimed in claim 2, wherein the obtaining a transformation matrix from an orbital coordinate system to the transformed spacecraft body-fixed coordinate system, comprises:

obtaining, according to attitude quaternions of the LEO satellite at a transformation moment, a second transformation matrix $R_{B2I}$ from the spacecraft body-fixed coordinate system to an inertial coordinate system; wherein a formula of the second transformation matrix $R_{B2I}$ is expressed as follows:

$$R_{B2I} = \begin{pmatrix} 1 - 2 \times (q_2^2 + q_3^2) & 2 \times (q_1 q_2 - q_0 q_3) & 2 \times (q_1 q_3 + q_0 q_2) \\ 2 \times (q_1 q_2 + q_0 q_3) & 1 - 2 \times (q_1^2 + q_3^2) & 2 \times (q_2 q_3 - q_0 q_1) \\ 2 \times (q_1 q_3 - q_0 q_2) & 2 \times (q_2 q_3 + q_0 q_1) & 1 - 2 \times (q_1^2 + q_2^2) \end{pmatrix};$$

wherein $q_0$, $q_1$, $q_2$ and $q_3$ are the attitude quaternions of the LEO satellite;

obtaining, according to a precision orbit vector $\vec{r}_L$ and a velocity vector $\vec{v}_L$ of the inertial coordinate system at the transformation moment, a third transformation matrix $R_{I2RTA}$ from the inertial coordinate system to the orbital coordinate system; wherein a formula of the third transformation matrix $R_{I2RTA}$ is expressed as follows:

$$R_{I2RTA} = \begin{pmatrix} \dfrac{\vec{v}_L}{\|\vec{v}_L\|} \times \left( \dfrac{\vec{r}_L}{\|\vec{r}_L\|} \times \dfrac{\vec{v}_L}{\|\vec{v}_L\|} \right) \\ \dfrac{\vec{v}_L}{\|\vec{v}_L\|} \\ \dfrac{\vec{r}_L}{\|\vec{r}_L\|} \times \dfrac{\vec{v}_L}{\|\vec{v}_L\|} \end{pmatrix};$$

wherein $\|\cdot\|$ represents a modulus of each vector;

obtaining, according to the second transformation matrix $R_{B2I}$ and the third transformation matrix $R_{I2RTA}$, a fourth transformation matrix $R_{B2RTA}$ from the spacecraft body-fixed coordinate system to the orbital coordinate system; wherein a formula of the fourth transformation matrix $R_{B2RTA}$ is expressed as follows:

$$R_{B2RTA} = R_{I2RTA} \cdot R_{B2I};$$

obtaining, according to the fourth transformation matrix $R_{B2RTA}$ and the first transformation matrix $R_{B2Bf}$, the transformation matrix $R_{RTA2Bf}$ from the orbital coordinate system to the transformed spacecraft body-fixed coordinate system; wherein a formula of the transformation matrix $R_{RTA2Bf}$ is expressed as follows:

$$R_{RTA2Bf} = R_{B2Bf} \cdot R_{B2RTA}^T;$$

wherein $$R_{B2RTA}^T$$

represents a transpose matrix of the fourth transformation matrix $R_{B2RTA}$.

4. The method to predict and fit the APC of the LEO satellite considering attitude information as claimed in claim 1, wherein the corresponding rotation angles during the transformation process comprise: a rotation angle $\alpha_X$ rotating around the X-axis of the orbital coordinate system, a rotation angle $\alpha_Y$ rotating around the Y-axis of the orbital coordinate system and a rotation angle $\alpha_Z$ rotating around the Z-axis of the orbital coordinate system; wherein formulas of the rotation angle $\alpha_X$, the rotation angle $\alpha_Y$ and the rotation angle $\alpha_Z$ are expressed as follows:

$$\alpha_X = \arctan\left(\frac{R_{RTA2Bf}(2,3)}{R_{RTA2Bf}(3,3)}\right);$$

$$\alpha_Y = \arctan\left(\frac{R_{RTA2Bf}(1,3)}{\sqrt{R^2_{RTA2Bf}(1,1)+R^2_{RTA2Bf}(1,2)}}\right);$$

$$\alpha_Z = \arctan\left(\frac{R_{RTA2Bf}(1,2)}{R_{RTA2Bf}(1,1)}\right);$$

wherein arctan(•) represents an inverse tangent function, $R_{RTA2Bf}(2,3)$ represents an element in a second row and a third column of the transformation matrix from the orbital coordinate system to the transformed spacecraft body-fixed coordinate system, $R_{RTA2Bf}(3,3)$ represents an element in a third row and the third column of the transformation matrix from the orbital coordinate system to the transformed spacecraft body-fixed coordinate system, $R_{RTA2Bf}(1,3)$ represents an element in a first row and the third column of the transformation matrix from the orbital coordinate system to the transformed spacecraft body-fixed coordinate system, $R_{RTA2Bf}(1,1)$ represents an element in the first row and a first column of the transformation matrix from the orbital coordinate system to the transformed spacecraft body-fixed coordinate system, and $R_{RTA2Bf}(1,2)$ represents an element in the first row and a second column of the transformation matrix from the orbital coordinate system to the transformed spacecraft body-fixed coordinate system.

5. The method to predict and fit the APC of the LEO satellite considering attitude information as claimed in claim 1, wherein the obtaining rotation angles of an orbit determination time period to predict rotation angles of an orbit prediction time period, comprises:

taking rotation angles obtained at a last moment in the orbit determination time period as the rotation angles of the orbit prediction time period; or taking average values of rotation angles at last moments in the orbit determination time period as the rotation angles of the orbit prediction time period.

6. The method to predict and fit the APC of the LEO satellite considering attitude information as claimed in claim 3, wherein the obtaining, according to the rotation angles of the orbit prediction time period, a transformation matrix from the spacecraft body-fixed coordinate system to an Earth-fixed coordinate system corresponding to each prediction moment in the orbit prediction time period, comprises:

obtaining, according to rotation angles $\alpha_X(t_P)$, $\alpha_Y(t_P)$ and $\alpha_Z(t_P)$ of the orbit prediction time period corresponding to a prediction moment $t_P$ in the orbit prediction time period, a transformation matrix $R_{RTA2Bf}(t_P)$ from the orbital coordinate system to the transformed spacecraft body-fixed coordinate system at the prediction moment $t_P$ in the orbit prediction time period;

obtaining, according to a precision orbit vector and a velocity vector of the inertial coordinate system corresponding to the prediction moment $t_P$ in the orbit prediction time period, a transformation matrix $R_{I2RTA}(t_P)$ from the inertial coordinate system to the orbital coordinate system at the prediction moment $t_P$ in the orbit prediction time period;

obtaining, according to a modified Julian day of a floating point, Earth rotation parameters and leap second information corresponding to the transformation moment, a transformation matrix $R_{I2E}$ from the inertial coordinate system to the Earth-fixed coordinate system at the prediction moment $t_P$ in the orbit prediction time period; and obtaining, according to the first transformation matrix $R_{B2Bf}$, the transformation matrix $R_{RTA2Bf}(t_P)$, the transformation matrix $R_{I2RTA}(t_P)$ and the transformation matrix $R_{I2E}$, the transformation matrix $R_{B2E}(t_P)$ from the spacecraft body-fixed coordinate system to the Earth-fixed coordinate system corresponding to the prediction moment $t_P$ in the orbit prediction time period; wherein a formula of the transformation matrix $R_{B2E}(t_P)$ is expressed as follows:

$$R_{B2E}(t_P) = R_{I2E} \cdot R^T_{I2RTA}(t_P) \cdot R^T_{RTA2Bf}(t_P) \cdot R_{B2Bf};$$

wherein $$R^T_{I2RTA}(t_P)$$

represents a transpose matrix of the transformation matrix $R_{I2RTA}(t_P)$, and $$R^T_{RTA2Bf}(t_P)$$

represents a transpose matrix of the transformation matrix $R_{RTA2Bf}(t_P)$.

7. The method to predict and fit the APC of the LEO satellite considering attitude information as claimed in claim 6, wherein the obtaining, according to the transformation matrix from the spacecraft body-fixed coordinate system to the Earth-fixed coordinate system corresponding to each prediction time in the orbit prediction time period, a correction vector from a CoM to a phase center of a downlink signal antenna of a LEO satellite in the Earth-fixed coordinate system at each prediction time in the orbit prediction time period, comprises:

obtaining a correction vector $\Delta \vec{r}_{LB}(t_P)$ from the CoM to the phase center of the downlink signal antenna of the LEO satellite in the spacecraft body-fixed coordinate system at the prediction moment $t_P$ in the orbit prediction time period;

obtaining, according to the correction vector $\Delta \vec{r}_{LB}(t_P)$ and the transformation matrix $R_{B2E}(t_P)$, a correction vector $\Delta \vec{r}_{LE}(t_P)$ from the CoM to the phase center of the downlink signal antenna of the LEO satellite in the Earth-fixed coordinate system at the prediction moment $t_P$ in the orbit prediction time period; wherein a formula of the correction vector $\Delta\vec{r}_{LE}(t_P)$ is expressed as follows:

$$\Delta\vec{r}_{LE}(t_P) = R_{B2E}(t_P) \cdot \Delta\vec{r}_{LB}(t_P);$$

obtaining the correction vector from the CoM to the phase center of the downlink signal antenna of the LEO satellite in the Earth-fixed coordinate system at the prediction time $t_P$ in the orbit prediction time period.

8. The method to predict and fit the APC of the LEO satellite considering attitude information as claimed in claim 7, wherein the obtaining, according to the correction vector, an orbit coordinate of the phase center of the downlink signal antenna of the LEO satellite at each prediction time in the orbit prediction time period to obtain an orbit of the phase center of the downlink signal antenna of the LEO satellite, comprises:

obtaining a precision orbit vector $\vec{r}_{LE}(t_P)$ of the Earth-fixed coordination system of the LEO satellite at the prediction moment $t_P$ in the orbit prediction time period;

obtaining, according to the precision orbit vector $\vec{r}_{LE}(t_P)$ and the correction vector $\Delta\vec{r}_{LE}(t_P)$, an orbit coordinate $\vec{r}_{APC}(t_P)$ of the phase center of the downlink signal antenna of the LEO satellite at the prediction time $t_P$ in the orbit prediction time period; wherein a formula of the orbit coordinate $\vec{r}_{APC}(t_P)$ is expressed as follows:

$$\vec{r}_{APC}(t_P) = \vec{r}_{LE}(t_P) + \Delta\vec{r}_{LE}(t_P);$$

obtaining the orbit coordinate of the phase center of the downlink signal antenna of the LEO satellite at each prediction time in the orbit prediction time period to obtain the orbit of the phase center of the downlink signal antenna of the LEO satellite.

9. The method to predict and fit the APC of the LEO satellite considering attitude information as claimed in claim 1, wherein the performing an ephemeris parameter fitting on the orbit of the phase center of the downlink signal antenna of the LEO satellite in a fitting time period, comprises:

selecting, according to an orbit vector and a velocity vector of the orbit of the phase center of the downlink signal antenna of the LEO satellite in the fitting time period, ephemeris parameters of the LEO satellite, and fitting the ephemeris parameters of the LEO satellite; wherein the velocity vector of the orbit of the phase center of the downlink signal antenna of the LEO satellite is equal to a velocity vector of the CoM of the LEO satellite.

*    *    *    *    *